(12) United States Patent
Lindén et al.

(10) Patent No.: US 8,220,164 B2
(45) Date of Patent: Jul. 17, 2012

(54) CUTTING TOOL

(75) Inventors: Olavi Lindén, Billnäs (FI); Markus Paloheimo, Karjaa (FI)

(73) Assignee: Fiskars Brands Finland Oy AB, Billnas (FI)

( * ) Notice: Subject to any disclaimer, the term of this patent is extended or adjusted under 35 U.S.C. 154(b) by 432 days.

(21) Appl. No.: 12/542,517

(22) Filed: Aug. 17, 2009

(65) Prior Publication Data
US 2010/0043237 A1 Feb. 25, 2010

(30) Foreign Application Priority Data
Aug. 19, 2008 (FI) .................................. 20085780

(51) Int. Cl.
*B26B 13/00* (2006.01)
(52) U.S. Cl. ............ 30/252; 30/250; 30/340; 30/251
(58) Field of Classification Search ...... 30/120.3–120.5, 30/250, 244, 251–253, 340–344, 98, 108
See application file for complete search history.

(56) References Cited

U.S. PATENT DOCUMENTS

| | | | |
|---|---|---|---|
| 107,577 A | 9/1870 | Will | |
| 157,610 A | 12/1874 | King | |
| 476,459 A * | 6/1892 | Hamann | 30/252 |
| 573,548 A * | 12/1896 | Sours | 30/192 |
| 640,257 A * | 1/1900 | Baer | 30/252 |
| 823,367 A | 6/1906 | Ryan | |
| 863,111 A * | 8/1907 | Smohl | 30/192 |
| 1,065,753 A * | 6/1913 | Whitney | 30/250 |
| 1,066,675 A | 7/1913 | Stowell | |
| 1,097,773 A * | 5/1914 | Sawin | 30/120.5 |
| 1,168,125 A | 1/1916 | Stowell | |
| 1,395,758 A * | 11/1921 | Maszczyk | 30/250 |
| 1,429,792 A | 9/1922 | Stiriss | |
| 1,455,297 A | 5/1923 | Lyons et al. | |
| 1,502,191 A | 7/1924 | Helwig | |
| 1,520,529 A | 12/1924 | Cagle | |
| 1,533,039 A | 4/1925 | Shirk | |
| 1,689,648 A | 10/1928 | Voleske | |
| 1,760,627 A | 5/1930 | Bernard | |
| 1,771,031 A | 7/1930 | Court | |
| 1,897,532 A | 2/1933 | Pilcher | |
| 1,915,404 A * | 6/1933 | Clifton | 81/365 |
| 2,516,946 A | 8/1950 | Barone | |

(Continued)

FOREIGN PATENT DOCUMENTS
EP 0 747 181 12/1996
(Continued)

OTHER PUBLICATIONS
U.S. Appl. No. 12/600,819, filed May 20, 2008, Linden et al.
(Continued)

*Primary Examiner* — Sean Michalski
(74) *Attorney, Agent, or Firm* — Foley & Lardner LLP

(57) ABSTRACT

A cutting tool includes a metal plate including a blade that forms a cutting jaw with an anvil, the metal plate being connected in an articulated manner to an anvil part at a first pivot point and connected operationally to a first elongated element having a first tooth gear part for opening and closing the cutting jaw in response to the relative turning movement of the first elongated element and a second elongated element, having a second tooth gear part, about the second and the third pivot points respectively.

23 Claims, 6 Drawing Sheets

U.S. PATENT DOCUMENTS

| | | | |
|---|---|---|---|
| 2,520,905 A * | 9/1950 | Borrelli | 30/237 |
| 2,520,908 A | 9/1950 | Carson et al. | |
| 2,528,816 A | 11/1950 | Boyer | |
| 2,557,506 A | 6/1951 | Kovacevich | |
| 2,674,796 A | 4/1954 | Herold | |
| 2,769,237 A | 11/1956 | Oxhandler | |
| 2,993,275 A * | 7/1961 | Naito | 30/250 |
| 3,372,478 A * | 3/1968 | Wallace et al. | 30/193 |
| 3,390,455 A * | 7/1968 | Florian | 30/251 |
| 3,760,500 A | 9/1973 | Eads et al. | |
| 3,851,389 A * | 12/1974 | Swanson | 30/250 |
| 4,031,621 A | 6/1977 | Arlett | |
| 4,046,148 A | 9/1977 | Meador | |
| 4,094,064 A | 6/1978 | Nishikawa et al. | |
| 4,130,938 A * | 12/1978 | Uhlmann | 30/192 |
| 4,528,707 A | 7/1985 | Aida | |
| 4,599,795 A | 7/1986 | Yokoyama | |
| 4,677,748 A * | 7/1987 | Kobayashi | 30/250 |
| D301,537 S | 6/1989 | Pittaway | |
| D301,538 S | 6/1989 | Pittaway | |
| D305,090 S | 12/1989 | Collins et al. | |
| 4,947,553 A | 8/1990 | Bendickson et al. | |
| 4,964,216 A | 10/1990 | Gosselin | |
| 5,020,222 A | 6/1991 | Gosselin et al. | |
| 5,058,277 A | 10/1991 | Kishimoto | |
| 5,079,801 A | 1/1992 | Peterson | |
| 5,084,975 A | 2/1992 | Melter | |
| D336,222 S | 6/1993 | Wensley et al. | |
| D336,412 S | 6/1993 | Wensley et al. | |
| D336,835 S | 6/1993 | Lutzke | |
| 5,241,752 A | 9/1993 | Lutzke et al. | |
| 5,255,438 A | 10/1993 | Morgan | |
| D342,652 S | 12/1993 | Wensley et al. | |
| 5,267,400 A | 12/1993 | Danube et al. | |
| D343,773 S | 2/1994 | Lutzke | |
| D347,771 S | 6/1994 | Lutzke | |
| 5,367,774 A | 11/1994 | Labarre et al. | |
| D354,890 S | 1/1995 | Concari et al. | |
| D359,427 S | 6/1995 | Birkholz | |
| 5,426,857 A | 6/1995 | Lindén | |
| D359,890 S | 7/1995 | Wensley | |
| D361,700 S | 8/1995 | Birkholz | |
| D362,162 S | 9/1995 | Wensley | |
| 5,469,625 A | 11/1995 | Melter et al. | |
| 5,511,314 A | 4/1996 | Huang | |
| D369,531 S | 5/1996 | Birkholz | |
| 5,570,510 A | 11/1996 | Lindén | |
| D377,588 S | 1/1997 | Birkholz | |
| 5,592,743 A | 1/1997 | Labarre et al. | |
| 5,636,443 A | 6/1997 | Lindén | |
| 5,689,888 A * | 11/1997 | Linden | 30/250 |
| D387,647 S | 12/1997 | Lindén | |
| 5,697,159 A | 12/1997 | Lindén | |
| D393,193 S | 4/1998 | Schneider et al. | |
| 5,761,815 A * | 6/1998 | Lin | 30/251 |
| 5,933,965 A | 8/1999 | Lindén et al. | |
| 5,950,315 A | 9/1999 | Lindén | |
| 5,974,670 A | 11/1999 | Hsieh | |
| 6,101,725 A | 8/2000 | Lindén | |
| 6,105,257 A | 8/2000 | Rutkowski et al. | |
| 6,161,291 A | 12/2000 | DiMatteo et al. | |
| 6,199,284 B1 | 3/2001 | Nilsson et al. | |
| 6,202,310 B1 | 3/2001 | Lindén | |
| 6,345,446 B1 * | 2/2002 | Huang | 30/250 |
| 6,418,626 B1 | 7/2002 | Jang | |
| 6,493,943 B1 | 12/2002 | Lindèn | |
| 6,513,248 B2 | 2/2003 | Linden et al. | |
| 6,711,820 B2 | 3/2004 | Chen | |
| 6,748,663 B2 | 6/2004 | Lindén | |
| 6,785,969 B2 | 9/2004 | Wang | |
| 6,789,324 B2 * | 9/2004 | Linden et al. | 30/245 |
| 6,829,828 B1 | 12/2004 | Cech et al. | |
| 6,829,829 B1 | 12/2004 | Huang | |
| D501,379 S | 2/2005 | Lipscomb et al. | |
| D503,595 S | 4/2005 | Lipscomb et al. | |
| 6,935,031 B1 * | 8/2005 | Huang | 30/250 |
| 6,938,346 B1 * | 9/2005 | Huang | 30/250 |
| 7,080,455 B1 | 7/2006 | Ronan et al. | |
| 7,127,819 B1 | 10/2006 | Huang | |
| D576,011 S | 9/2008 | Lipscomb et al. | |
| 7,530,172 B1 * | 5/2009 | Wu | 30/244 |
| 7,681,318 B2 | 3/2010 | Hsieh | |
| D621,234 S | 8/2010 | Goetz et al. | |
| 2001/0005941 A1 | 7/2001 | DiMatteo et al. | |
| 2002/0000044 A1 * | 1/2002 | Huang | 30/250 |
| 2002/0046466 A1 | 4/2002 | Deville | |
| 2002/0066188 A1 * | 6/2002 | Wu | 30/250 |
| 2003/0014868 A1 * | 1/2003 | Cech et al. | 30/296.1 |
| 2003/0136008 A1 * | 7/2003 | Lin | 30/250 |
| 2004/0064954 A1 * | 4/2004 | Schmidt | 30/251 |
| 2005/0172499 A1 * | 8/2005 | Huang | 30/250 |
| 2006/0156554 A1 | 7/2006 | Lin | |
| 2006/0277764 A1 | 12/2006 | Hsien | |
| 2007/0079512 A1 * | 4/2007 | Nelson et al. | 30/123.3 |
| 2008/0052916 A1 | 3/2008 | Lin | |
| 2008/0155835 A1 | 7/2008 | Lin | |
| 2008/0276464 A1 | 11/2008 | Hatch | |
| 2008/0282549 A1 | 11/2008 | Lin | |
| 2009/0044412 A1 | 2/2009 | Hsieh | |
| 2010/0043237 A1 | 2/2010 | Linden et al. | |
| 2010/0043238 A1 | 2/2010 | Linden et al. | |
| 2010/0162575 A1 | 7/2010 | Lin | |
| 2010/0199502 A1 | 8/2010 | Linden et al. | |
| 2011/0154668 A1 | 6/2011 | Liu et al. | |
| 2011/0283545 A1 * | 11/2011 | Wu | 30/250 |

FOREIGN PATENT DOCUMENTS

| | | |
|---|---|---|
| EP | 1 153 713 | 11/2001 |
| EP | 1 166 620 | 1/2002 |
| EP | 1 625 784 B1 | 2/2006 |
| EP | 2 156 730 | 2/2010 |
| EP | 2 156 731 | 2/2010 |
| FR | 2 825 573 A3 | 12/2002 |
| GB | 605038 A | 7/1948 |
| GB | 2 375 500 B | 3/2004 |
| GB | 2 468 665 | 9/2010 |
| JP | 08-331979 | 12/1996 |
| JP | 11-057243 | 3/1999 |
| JP | 2002-066168 | 3/2002 |
| WO | WO 2007/128879 A1 | 11/2007 |

OTHER PUBLICATIONS

U.S. Appl. No. 12/542,536, filed Aug. 17, 2009, Linden et al.
U.S. Appl. No. 12/300,099, filed May 8, 2007, Linden et al.
European Search Report for 09167978.7; dated Feb. 23, 2011, 6 pages.

\* cited by examiner

CUTTING TOOL

CROSS REFERENCE TO RELATED APPLICATIONS

The present Application claims the benefit of priority of Finnish patent application No. 20085780 titled "Cutting Tool" filed on Aug. 19, 2008, the disclosure of which is hereby incorporated by reference in its entirety.

FIELD

The invention relates to a cutting tool. The invention more particularly relates to a cutting tool having a plurality of engagement points for performing cutting operations in a stepwise manner.

BACKGROUND

In various manually operated cutting tools for cutting branches or similar objects to be cut it is generally known to utilize a mechanism that allows stepwise cutting of the object to be cut. The mechanisms are arranged to work such that when an object to be cut, having a first diameter or thickness, is placed in the cutting jaw of the cutting tool the cutting is performed with one cutting movement. Whereas, when an object to be cut, having a second diameter or thickness that is larger than the first diameter or thickness, is placed in the cutting jaw of the cutting tool, the cutting of the object takes place stepwise with two or more successive cutting movements, whereby each cutting movement cuts a portion of the diameter or thickness of the object to be cut. Cutting tools of this kind generally comprise a first and a second elongated elements, which further comprise a first and a second handles, whose relative turning movement allows the cutting jaw of the cutting tool to be set in a closed and an open position. These cutting tools generally also comprise an immobile blade, e.g. an anvil, and a movable blade that moves in response to the relative movement of the first and the second handles. The first or the second of the handles is further connected operationally to a movable blade with a lever mechanism for force transmission. The first end of the lever in the lever mechanism is thus connected to the first or the second elongated element in an articulated manner at a pivot point. The movable blade is further provided with two or more engagement points wherewith the second end of the lever optionally engages in order to enable stepwise cutting as presented above. A tool of this kind is set forth in U.S. Pat. No. 5,511,314. In addition, these cutting tools, which comprise one moving blade and one immobile blade or anvil, are conventionally provided such that the anvil or the immobile blade are provided integrally or fixedly in one of the handles.

One disadvantage with the above arrangement is that in these known cutting mechanisms the lever and the engagement points are implemented such that the cutting force exerted on the blade by means of the relative movement of the handles is not transmitted to the blade in an optimal manner, but force is lost, whereby in all cutting steps there is not an equal amount of force available. In that case, in the known cutting tool's engagement points, wherewith the second end of the lever engages, are placed substantially successively away from the pivot point about which the moving blade rotates during the cutting movement. In other words, the engagement points are placed on a line extending substantially radially away from the pivot point about which the moving blade rotates. In that case, all engagement points are significantly at different distances from the pivot point about which the lever turns the moving blade, whereby a good lever position is not achieved in all engagement points, but in at least some of the engagement points the lever is in a disadvantageous position for transmitting force to the blade, whereby cutting becomes cumbersome and more force must be exerted on the handles. A further disadvantage is posed by the fact that when one of the blades or the anvil is provided fixedly in one of the handles, the cutting movement is not symmetrical for both hands, which makes cutting more difficult. In addition, in these known tools enabling stepwise cutting considerably more force is required at the beginning of each cutting movement than at the end.

It would be advantageous to provide a cutting tool such that the above-mentioned problems may be solved. It would also be advantageous to provide a cutting tool with an anvil part which comprises at its distal end an anvil or a first blade, the anvil part comprising a first pivot point, a second pivot point and a third pivot point, and a first elongated element which comprises a first handle and a first tooth gear part, the first elongated element being connected in an articulated manner to the anvil part at the second pivot point, and a second elongated element which comprises a second handle and a second tooth gear part and which is connected in an articulated manner to the anvil part at the third pivot point such that the first and the second tooth gear parts are arranged to engage with one another by means of the first and the second tooth gear parts. It would be further advantageous to provide a metal plate which comprises a second blade forming a cutting jaw with the anvil or the first blade and which metal plate is connected in an articulated manner to the anvil part or to the first blade at the first pivot point and connected operationally to the first elongated element for opening and closing the cutting jaw in response to the relative turning movement of the first elongated element and the second elongated element about the second and the third pivot point respectively.

It would also be advantageous to provide a cutting tool where the first and the second elongated elements and hence the handles are connected in an articulated manner to the anvil part or the first blade as well as to one another with tooth gear parts and the second of the elongated elements is further connected with a lever mechanism to the second blade which is connected in an articulated manner to be rotatable in relation to the first blade. It would also be advantageous to provide a cutting tool with an engagement device in the metal plate and arranged to receive the second end of a first lever optionally at two or more engagement points in relation to the first pivot point so as to perform stepwise cutting movements.

The cutting tool according to the embodiments shown and described herein provide a cutting tool having one fixed blade or anvil and one moving blade, but in spite of that the cutting movement is substantially symmetrical for both hands, because both handles are separately pivoted to the anvil part or the fixed blade. The handles are further connected to one another with tooth gear parts. In addition, the lever mechanism enables stepwise cutting of an object to be cut with the cutting tool comprising the above-mentioned features. By means of the lever mechanism the cutting force of each step of the stepwise cutting can be rendered good by optimizing the lever arm produced by the lever mechanism. In other words, the lever mechanism permits each cutting step to be good, and because highest force for cutting is generally required in the last cutting step, where the object to be cut is cut off, said lever arm will be good also in the cutting step that closes the cutting jaw completely. In addition, need for force in each cutting movement is considerably more equal throughout than in known solutions.

SUMMARY

According to one embodiment, a cutting tool includes an anvil part having at its distal end an anvil or a first blade, the anvil part including a first pivot point, a second pivot point and a third pivot point. A first elongated element includes a first handle and a first tooth gear part, and is connected in an articulated manner to the anvil part at the second pivot point. A second elongated element includes a second handle and a second tooth gear part, and is connected in an articulated manner to the anvil part at the third pivot point such that the first and the second tooth gear parts are arranged to engage with one another by meshing of the first and the second tooth gear parts. A metal plate includes a second blade forming a cutting jaw with the anvil or the first blade and is connected in an articulated manner to the anvil part or the first blade at the first pivot point and connected operationally to the first elongated element for opening and closing the cutting jaw in response to the relative turning movement of the first elongated element and the second elongated element about the second and the third pivot points respectively.

According to another embodiment, a cutting tool includes a first cutting element having a first pivot point, a second pivot point and a third pivot point. A first elongated element has a first handle and a first tooth gear part and a fourth pivot point, and is coupled to the first cutting element at the second pivot point. A second elongated element has a second handle and a second tooth gear part, and is coupled to the first cutting element at the third pivot point such that the first and the second tooth gear parts engage one another. A second cutting element has a plurality of engagement points and forms a cutting jaw with the first cutting element, and is coupled to the first cutting element at the first pivot point. A lever has a first end and a second end, the first end coupled to the first elongated element at the fourth pivot point and the second end interfacing with the engagement points on the second cutting element for performing stepwise cutting movements.

BRIEF DESCRIPTION OF THE DRAWINGS

In the following embodiments, the invention will be described in greater detail in connection with exemplary embodiments, with reference to the attached drawings, in which.

DETAILED DESCRIPTION

Figure 1:
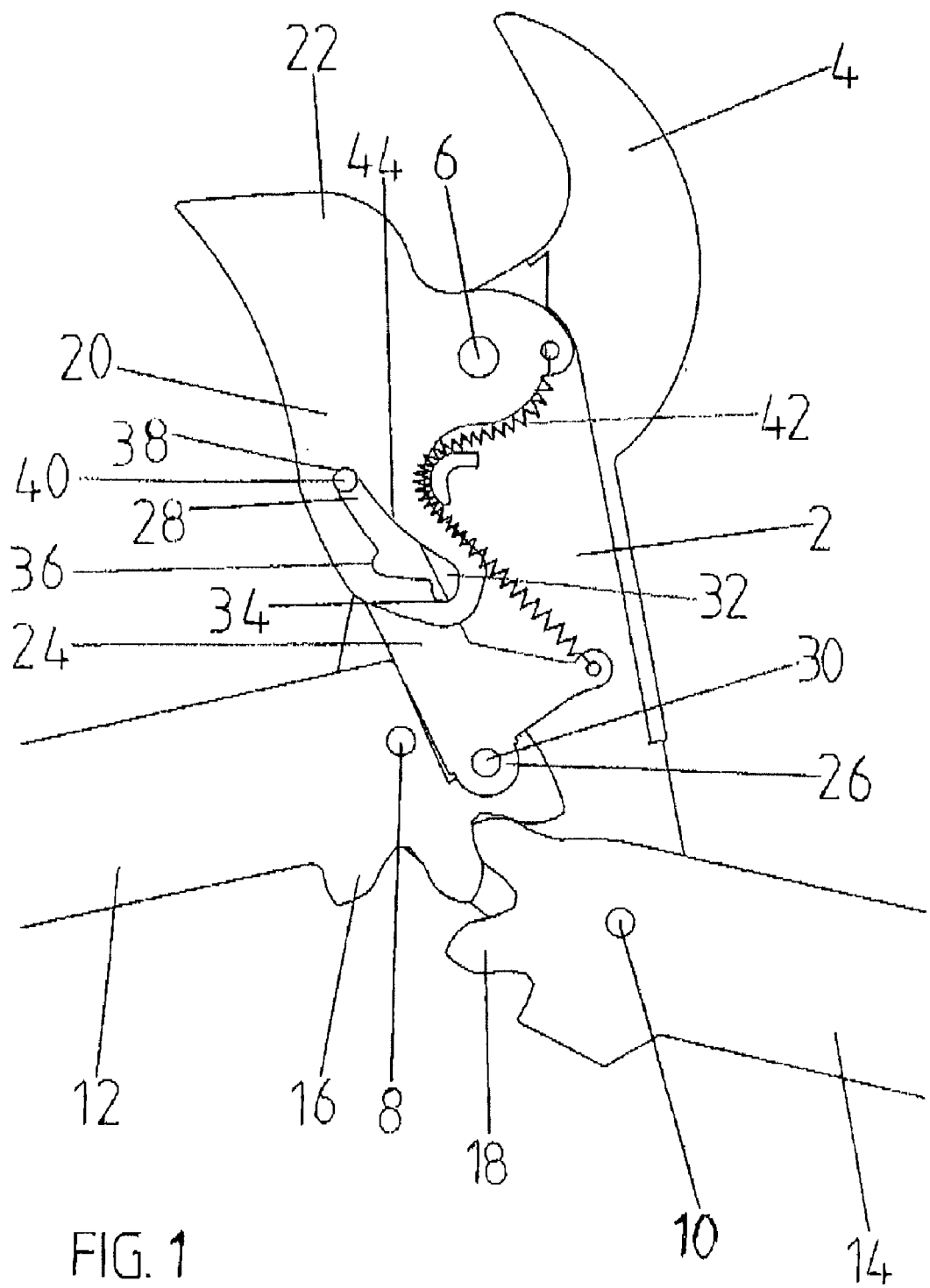
FIG. 1 shows a cutting tool according to an exemplary embodiment in a first open position.

Referring to FIGS. 1 to 6, a cutting tool is shown according to an exemplary embodiment. The cutting tool comprises an anvil part 2 whose distal end includes an anvil 4 or a first blade. In other words, the anvil 4 or the second blade may be integral parts of the anvil part 2 or they may be fixedly secured to the anvil part 2. The anvil part 2 further comprises a first pivot point 6, a second pivot point 8 and a third pivot point 10. The pivot points 6, 8 and 10 are holes which are provided in the anvil part and through which a pivot pin may be inserted.

The cutting tool also comprises a first elongated element 12. The first elongated element 12 comprises at its anvil-side 2 end or in the vicinity thereof a first tooth gear part 16. The first elongated element 12 also comprises a first handle (not shown). The first elongated element 12 is connected in an articulated manner to the anvil part 2 at the second pivot point 8. The cutting tool further comprises a second elongated element 14. The second elongated element 14 also comprises at its anvil-side 2 end or in the vicinity thereof a second tooth gear part 18. The second elongated element 14 also comprises a second handle (not shown). The second elongated element 14 is further connected in an articulated manner to the anvil part 2 at a third pivot point 10. The first and the second elongated elements 12, 14 are connected in an articulated manner to the anvil part such that the first and the second tooth gear parts 16, 18 engage with one another.

The cutting tool also comprises a metal plate 20 having a second blade 22. The second blade 22 forms a cutting jaw with the anvil 4 or the first blade so as to receive an object to be cut. The metal plate 20 is connected in an articulated manner to the anvil part 2 or the first blade at the first pivot point 6, such that the second blade 22 is able to turn about the first pivot point 6 in relation to the anvil 4 for closing and opening the cutting jaw. The metal plate 20 is further connected operationally to the first elongated element 12 for opening and closing the cutting jaw in response to the relative turning movement of the first elongated element 12 and the second elongated element 14 about the second and the third pivot points 8, 10 respectively.

The metal plate 20 is connected operationally to the first elongated element 12 by means of a lever 24. The lever 24 has a first end 26 and a second end 28. The first end 26 engages with the first elongated element 12 and the second end engages with the metal plate 20 for transmitting force to the blade 22 in response to the relative turning movement of the first elongated element 12 and the second elongated element 14. In other words, the force exerted on the first and the second elongated elements 12, 14 is transmitted by means of the tooth gear parts 16, 18 to the lever 22 and further to the metal plate 20. The first elongated element 12 comprises a fourth pivot point 30 and the lever 24 is connected in an articulated manner to the first elongated element 12 at the fourth pivot point 30.

The cutting tool also comprises engagement devices 32, 34, 36, 38, 40 provided in the metal plate 20 and arranged to receive the second end 28 of the first lever 24 optionally at two or more engagement points 34, 36, 38 in relation to the first pivot point 6 so as to perform stepwise cutting movements. The engagement points 34, 36, 38 are placed successively on a line extending transversely to the line extending from the first pivot point 6 radially towards an engagement point or engagement points 34, 36, 38. The above mentioned line may be straight or it may form an arc that curves around the first pivot point 6 or spirally towards the first pivot point. In a preferred embodiment, the engagement points 34, 36, 38 are placed substantially at the same distance from the first pivot point 6 or the engagement points 34, 36, 38 are placed in the metal plate 20 such that the distance of the engagement point 34 closest to the fourth pivot point 30 is longer than the distance of the engagement point 36, 38 second and/or third closest to the fourth pivot point 30 from the first pivot point 6, and/or the engagement points 34, 36, 38 are placed in the metal plate 20 such that the distance of the engagement point 36 second closest to the fourth pivot point 30 from the first pivot point 6 is longer than the distance of the engagement point 38 third closest to the fourth pivot point 30 from the first pivot point 6. In the embodiment of FIGS. 1 to 6, the engagement point 38 is closer to the first pivot point 6 than the engagement points 34 and 36 which are substantially at the same distance from the first pivot point 6.

The engagement points 34, 36, 38 may further be placed in the metal plate 20 such that an angle between the line extending through the closest engagement point 34 to and furthest engagement point 38 from the fourth pivot point 30 and the line extending through the first pivot point 6 and the engagement point 34 closest to the third pivot point 30 will be substantially the same at the end of each cutting movement irrespective of the engagement point 34, 36, 38 wherewith the second end 28 of the lever 24 is engaged. In a preferred embodiment, the engagement points are placed in the metal plate 20 such that the angle between the line extending through the closest engagement point 34 to and furthest engagement point 38 from the fourth pivot point 30 and the line extending through the first pivot point 6 and the engagement point 34 closest to the third pivot point 30 is approximately 90 degrees at most, advantageously about 75 degrees at most and most advantageously about 60 degrees at most at the end of each cutting movement. Distribution of the engagement points may also be implemented such that the engagement points 34, 36, 38 are placed in the metal plate 20 such that an angle between the line extending through two adjacent or successive engagement points 34, 36, 38 and the line extending through the first pivot point 6 and an engagement point 32, 34 closer to the third pivot point 24 of the adjacent engagement points 34, 36, 38 is substantially the same at the end of each cutting movement irrespective of the engagement point 34, 36, 38 wherewith the second end 28 of the lever 24 is engaged and/or the angle is 90 degrees at most, advantageously about 75 degrees at most and most advantageously about 60 degrees at most at the end of each cutting movement.

As shown in FIG. 1, the engagement points are notches 34, 36, 38 that are arranged to receive optionally a pin 40 at the second end 28 of the lever 24 so as to engage the lever 24 with the metal plate 4 and to transmit force from the first and second elongated elements 12, 14 to the second blade 22. The engagement points 34, 36, 38 may be provided on the edge of the metal plate 20. However, the metal plate is advantageously provided with an aperture 32, through which the pin 40 at the second end 28 of the lever 24 is inserted and on the edge of which aperture 32 there are provided engagement points 34, 36, 36 as shown in FIGS. 1 to 6. The aperture 32 comprises a front surface 44 which is spiral in relation to the first pivot point 4 and with which the pin 40 engages for controlling the metal plate 2 as the cutting jaw opens. The engagement points 34, 36, 38 are provided on the rear surface of the aperture 32 opposite the front surface 44. In other words, when the cutting jaw is opened, the pin 40 at the second end 28 of the lever 24 shifts along the even front surface 44, and correspondingly, when the cutting jaw closes, along the rear surface of the aperture 32, where the engagement points are located.

The cutting tool also comprises a spring device 42 for pretensioning the metal plate 20 to a position, in which the second end 28 of the lever 24 engages with the engagement point 34 closest to the fourth pivot point 30. In the embodiment shown in the figures, the spring device 42 comprises a spiral spring that is connected between the metal plate 20 and the lever 24. Thus, the spring device 42 is provided such that it tends to close the cutting jaw to a position, in which the pin 40 engages with the engagement point 34 closest to the fourth pivot point 30.

Figure 5:
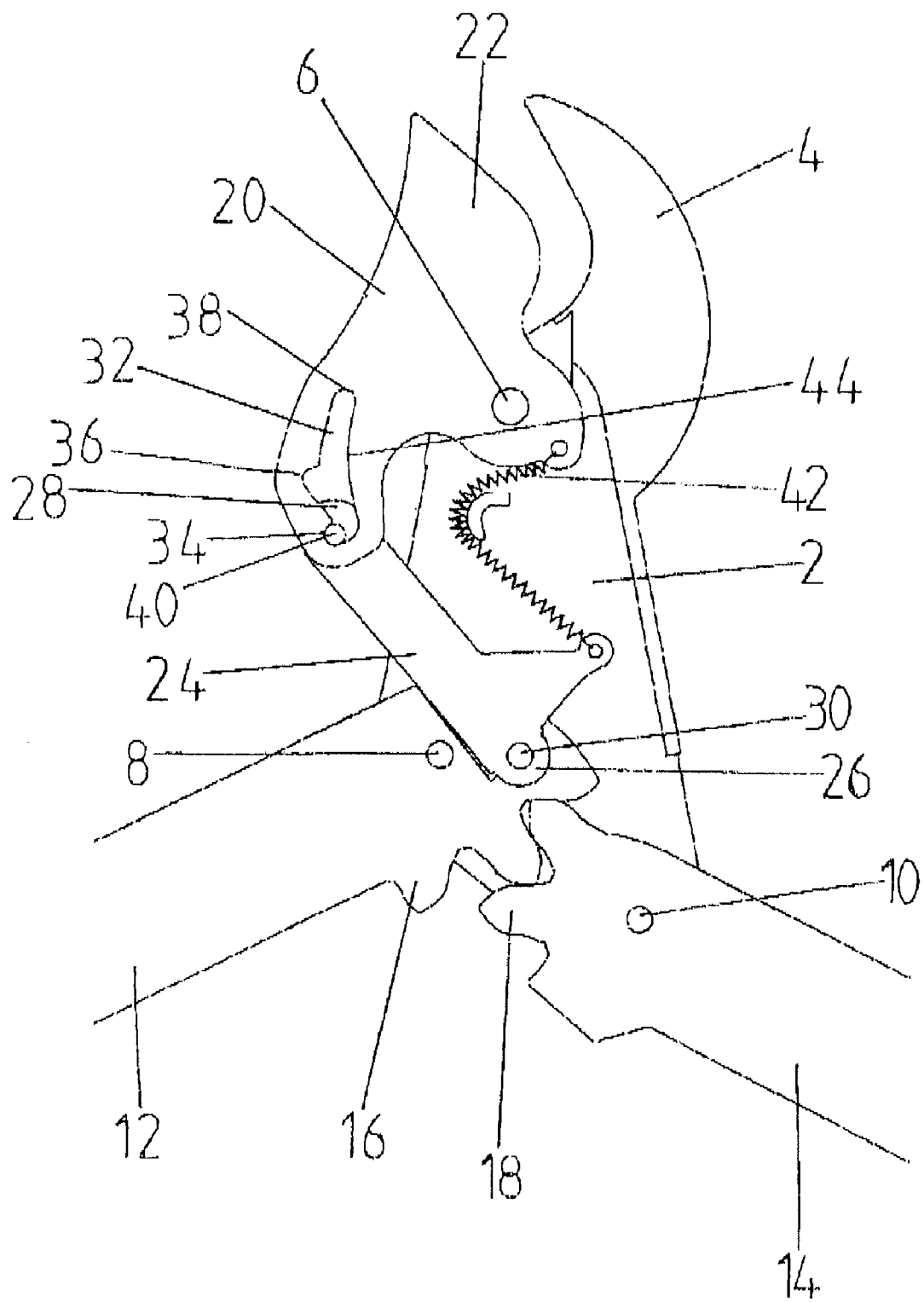
FIG. 5 shows the cutting tool of FIG. 1 in a third open position.
Figure 6:
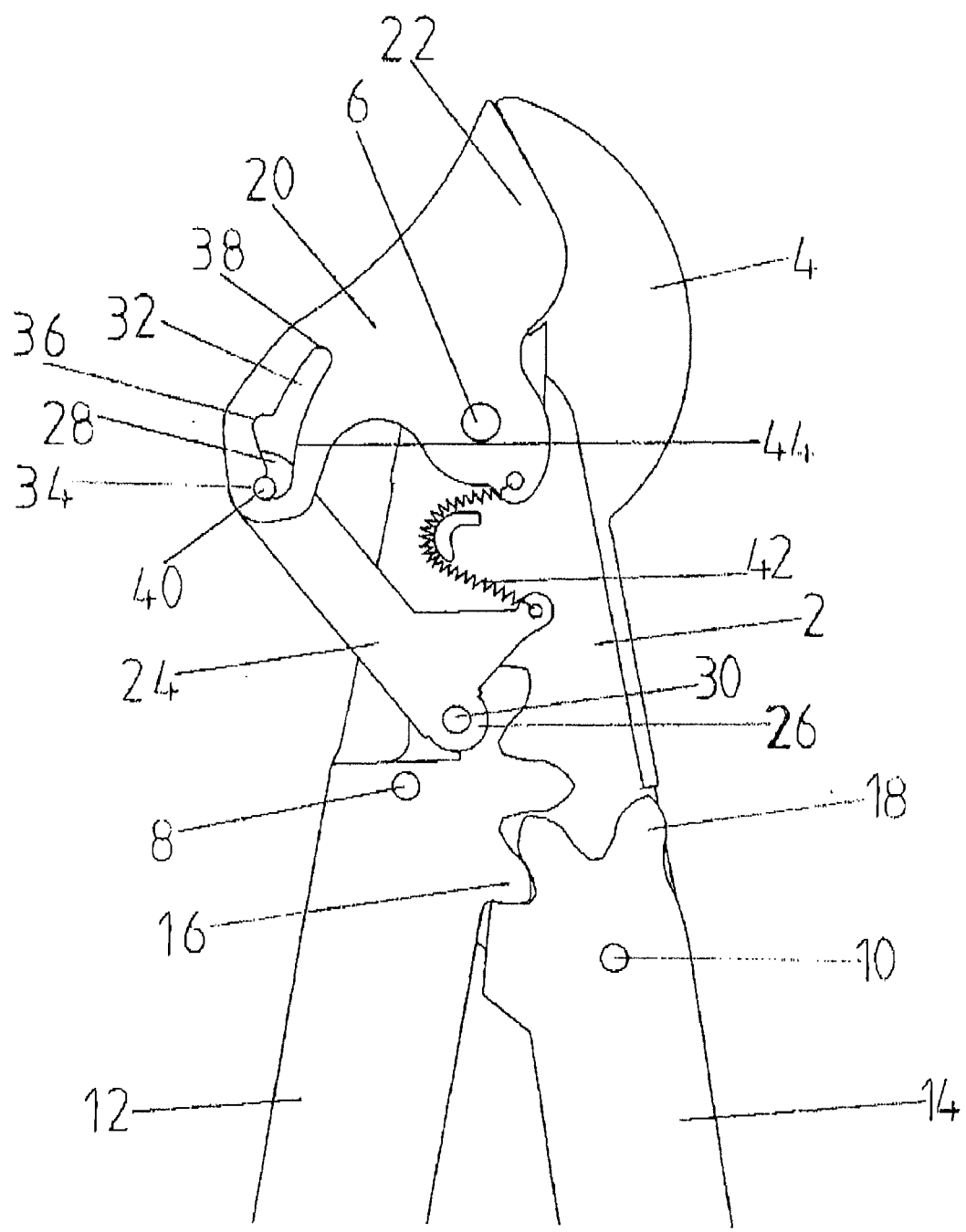
FIG. 6 shows the cutting tool of FIG. 1 in a third closed position.

The above-described cutting tool is arranged to operate such that when an object having a first thickness or diameter is cut, the second end 28 of the lever 24 engages with the engagement point 34 closest to the fourth pivot point 30 so as to perform a cutting movement as shown in FIG. 5. The cutting movement performed thereafter cuts off completely the object to be cut, when the second blade 22 and the anvil 4 are set substantially against one another as shown in FIG. 6.

Figure 3:
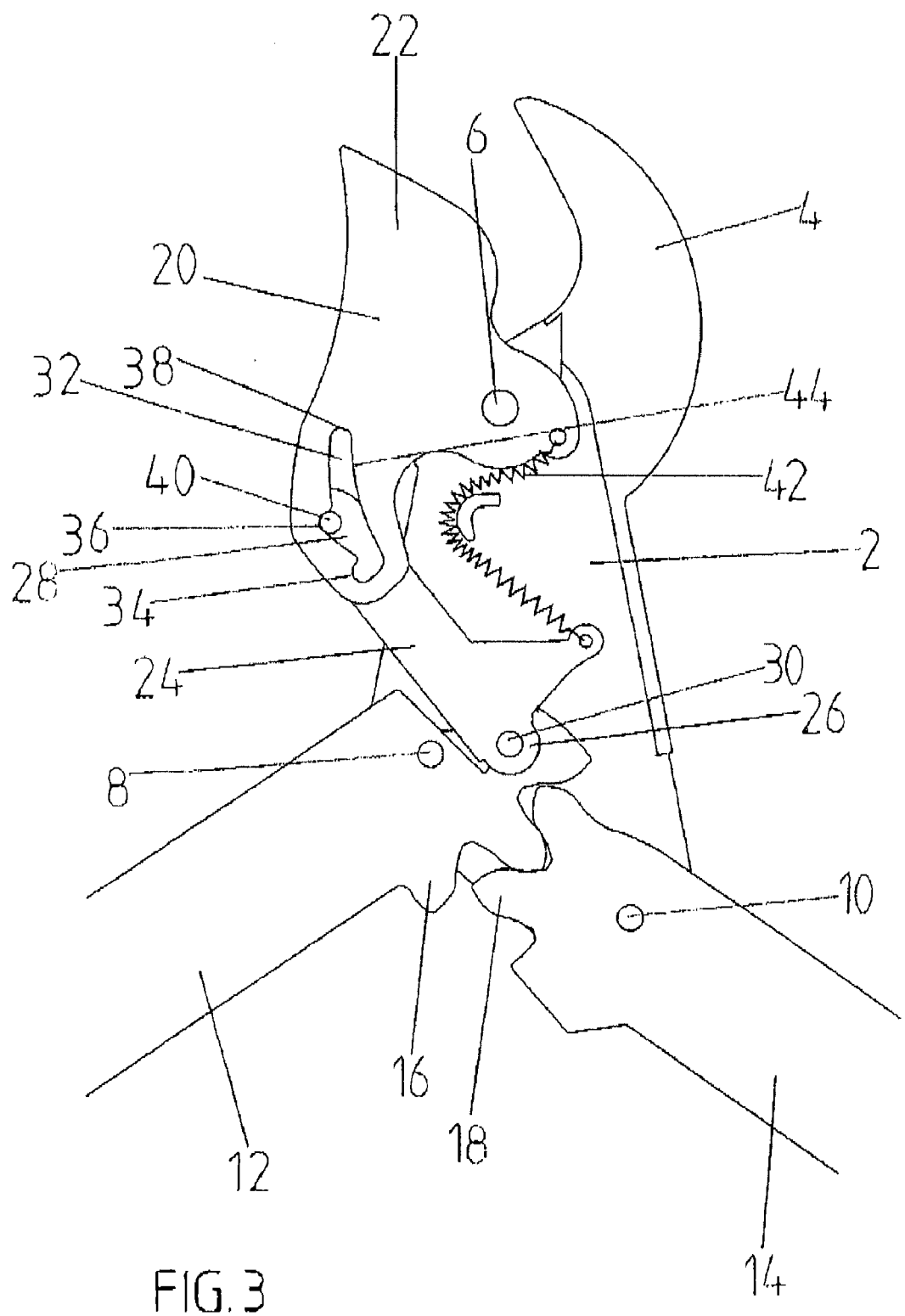
FIG. 3 shows the cutting tool of FIG. 1 in a second open position.
Figure 4:
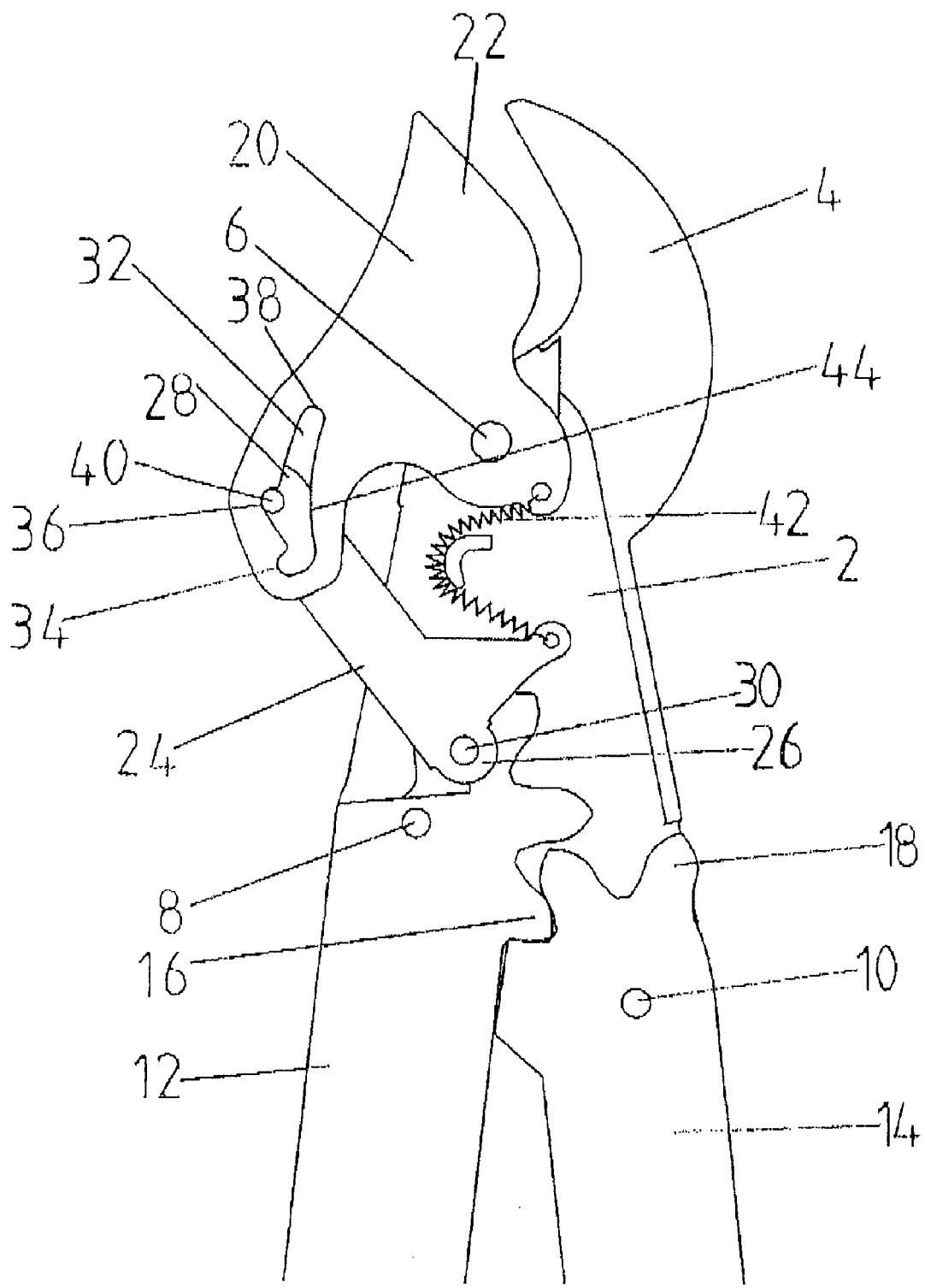
FIG. 4 shows the cutting tool of FIG. 1 in a second closed position.

Further, the cutting tool according to the illustrated embodiment is arranged to operate such that when an object having a second thickness or diameter, which is larger than the first thickness or diameter, is being cut, the second end 28 of the lever 24 engages with the engagement point 36 second closest to the fourth pivot point 30 in order to perform a first stepwise cutting movement in accordance with FIG. 3. The cutting movement to be performed thereafter cuts a first portion of the thickness or diameter of the object to be cut, when the first and the second elongated elements 12, 14 are shifted towards one another, as shown in FIG. 4. When the elongated elements 12, 14 are released, the second end 28 of the lever 24 engages with the engagement point 34 closest to the fourth pivot point 30, as shown in FIG. 5, in order to perform a second stepwise cutting movement that cuts a second portion of the thickness or diameter of the object to be cut finalizing the cutting of the object to be cut as shown in FIG. 6.

Figure 2:
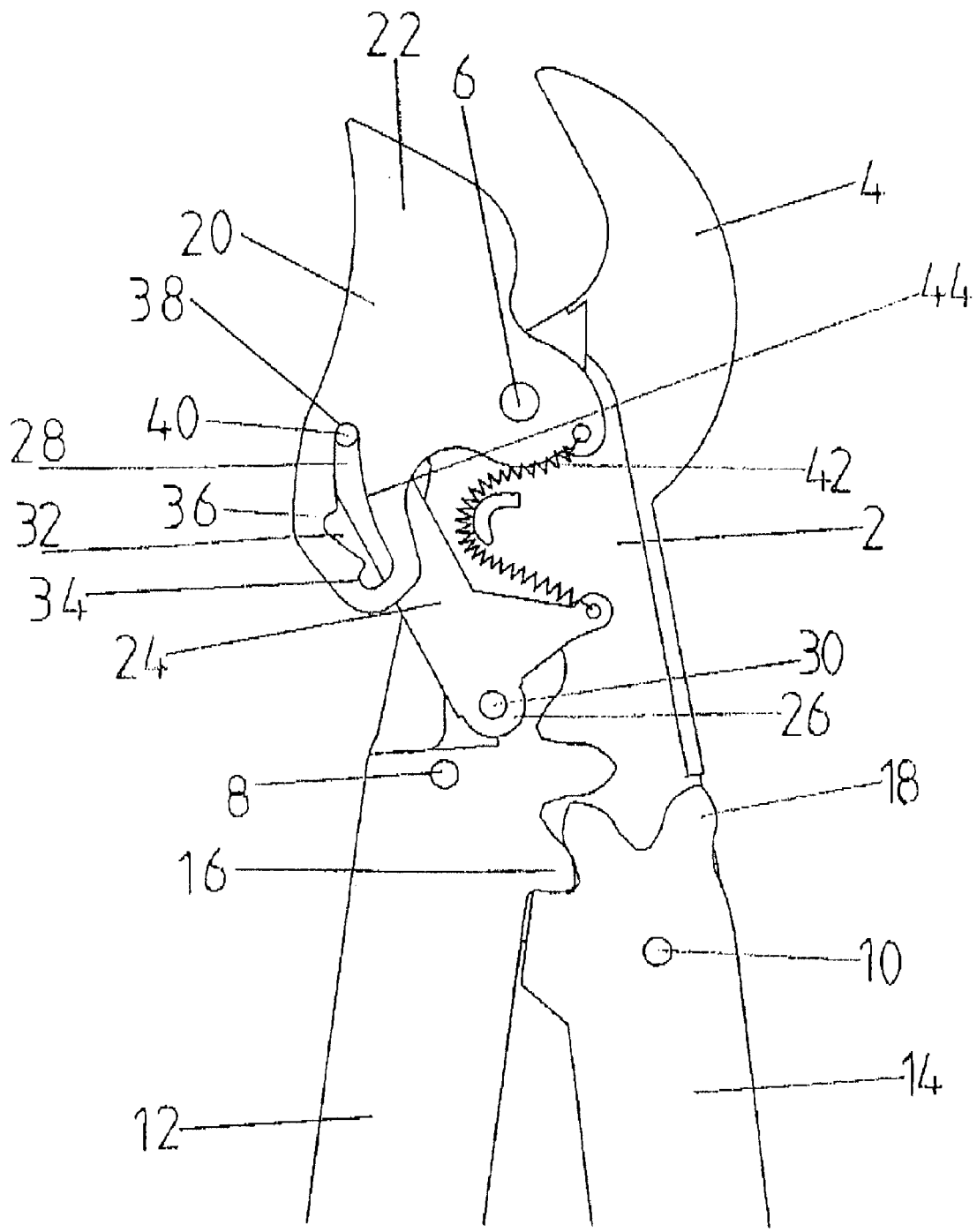
FIG. 2 shows the cutting tool of FIG. 1 in a first closed position.

The cutting tool is further arranged to operate such that when an object having a third thickness or diameter, which is larger than the second thickness or diameter, is being cut, the second end 28 of the lever 24 engages with the engagement point 38 third closest to the fourth pivot point 30 for performing the first stepwise cutting movement as shown in FIG. 1. The first cutting movement to be performed thereafter cuts a first portion of the thickness or diameter of the object to be cut, when the first and the second elongated elements 12, 14 are shifted towards one another as shown in FIG. 2. When the elongated elements 12, 14 are released, the second end 28 of the lever 24 engages with the engagement point 36 second closest to the fourth pivot point 30, as shown in FIG. 4, for performing the second stepwise cutting movement that cuts a second portion of the thickness of the object to be cut, when the first and second elongated elements 12, 14 are shifted towards one another, as shown in FIG. 3. When the elongated elements 12, 14 are released, the second end 28 of the lever 24 engages with the engagement point 34 closest to the fourth pivot point 30, as shown in FIG. 5, for performing the third stepwise cutting movement that cuts a third portion of the thickness or diameter of the object to be cut finalizing the cutting of the objet to be cut, as shown in FIG. 6.

The cutting tool according to the illustrated embodiment is arranged to operate such that when an object is being cut, the second end 28 of the lever 24 engages with the engagement point 34, 36, 38 whose distance from the fourth pivot point 30 corresponds to the thickness of the object to be cut, in order for a stepwise cutting movement to be performed, whereafter in a subsequent cutting movement the second end 28 of the lever 24 engages with the engagement point 34, 36 next closest to the fourth pivot point 30 in order to perform a next stepwise cutting movement.

In accordance with the above, the purpose of the spring device 42 is that, when the elongated elements 12, 14 are released by shifting them away from one another after the cutting movement, the spring device shifts the pin 40 along the rear surface of the aperture 32 to the engagement point 36, 34 next closest to the fourth pivot point 30.

It should be noted that the number of engagement points may vary from two to several in various embodiments of the invention. In addition the above-described embodiment of the invention represents clearing shears (or other suitable shears), but the invention may also be utilized in other manually operated cutting tools. The described embodiment further represents a cutting tool intended to be manipulated with two hands, but the disclosure of the invention may also be applied in cutting tools to be manipulated with one hand, such as pruning shears.

It is also important to note that the construction and arrangement of the elements of the cutting tool as shown schematically in the embodiments is illustrative only. Although only a few embodiments have been described in detail in this disclosure, those skilled in the art who review this disclosure will readily appreciate that many modifications are possible without materially departing from the novel teachings and advantages of the subject matter recited.

Accordingly, all such modifications are intended to be included within the scope of the present invention. Other substitutions, modifications, changes and omissions may be made in the design, operating conditions and arrangement of the preferred and other exemplary embodiments without departing from the spirit of the present invention.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present invention as expressed in the appended claims.

What is claimed is:

1. A cutting tool comprising:
   an anvil part which comprises at its distal end an anvil or a first blade, the anvil part comprising a first pivot point, a second pivot point and a third pivot point;
   a first elongated element which comprises a first handle and a first tooth gear part, the first elongated element being connected in an articulated manner to the anvil part at the second pivot point;
   a second elongated element which comprises a second handle and a second tooth gear part and which is connected in an articulated manner to the anvil part at the third pivot point such that the first and the second tooth gear parts are arranged to engage with one another by meshing of the first and the second tooth gear parts;
   a metal plate which comprises a second blade forming a cutting jaw with the anvil or the first blade and which metal plate is connected in an articulated manner to the anvil part or the first blade at the first pivot point and connected operationally to the first elongated element for opening and closing the cutting jaw in response to the relative turning movement of the first elongated element and the second elongated element about the second and the third pivot points respectively.

2. The cutting tool of claim 1, further comprising a lever having a first end and a second end, the first end being engaged with the first elongated element and the second end being engaged with the metal plate for transmitting force to the blade in response to the relative turning movement of the first elongated element and the second elongated element.

3. The cutting tool of claim 2, wherein the first elongated element comprises a fourth pivot point and that the lever is connected in an articulated manner to the first elongated element at the fourth pivot point.

4. The cutting tool of claim 2, wherein the cutting tool comprises an engagement device provided in the metal plate and arranged to receive the second end of the first lever optionally at two or more engagement points in relation to the first pivot point for performing stepwise cutting movements.

5. The cutting tool of claim 4, wherein the engagement points are placed successively on a line extending transversely to the line extending from the first pivot point radially towards the engagement point or engagement points.

6. The cutting tool of claim 4, wherein the engagement points are placed in a tongue successively on a line forming an arc that curves around the first pivot point.

7. The cutting tool of claim 4, wherein the engagement points are placed substantially at the same distance from the first pivot point.

8. The cutting tool of claim 4, wherein the engagement points are placed in the metal plate such that the distance of the engagement point closest to the fourth pivot point from the first pivot point is longer than the distance of the engagement point second or third closest to the fourth pivot point from the first pivot point, and/or the engagement points are placed in the metal plate such that the distance of the engagement point second closest to the fourth pivot point from the first pivot point is longer than the distance of the engagement point third closest to the fourth pivot point from the first pivot point at the end of each cutting movement.

9. The cutting tool of claim 4, wherein the engagement points are notches that are arranged to receive optionally a pin at the second end of the lever so as to engage the lever with the metal plate and to transmit force from the first and second elongated elements to the second blade.

10. The cutting tool of claim 4, wherein the engagement points are provided on the edge of the metal plate.

11. The cutting tool of claim 4, wherein in the metal plate there is provided an aperture through which the pin at the second end of the lever is inserted and on the edge of which aperture there are provided the engagement points.

12. The cutting tool of claim 11, wherein the aperture comprises in relation to the first pivot point a spiral front surface wherewith the pin engages for controlling the metal plate as the cutting jaw opens.

13. The cutting tool of claim 1, wherein the engagement points are placed in the metal plate such that an angle between the line extending through the closest engagement point to and furthest engagement point from the fourth pivot point and the line extending through the first pivot point and the engagement point closest to the third pivot point will be substantially the same at the end of each cutting movement irrespective of the engagement point wherewith the second end of the lever is engaged.

14. The cutting tool of claim 1, wherein the engagement points are placed in the metal plate such that the angle between the line extending through the closest engagement point to and furthest engagement point from the fourth pivot point and the line extending through the first pivot point and the engagement point closest to the third pivot point is within a range of approximately 60-90 degrees at the end of each cutting movement.

15. The cutting tool of claim 1, wherein the engagement points are placed in the metal plate such that an angle between the line extending through two adjacent or successive engagement points and the line extending through the first pivot point and an engagement point closer to the third pivot point of the adjacent engagement points is substantially the same at the end of each cutting movement irrespective of the engagement point wherewith the second end of the lever is engaged and the angle is within a range of approximately 60-90 degrees at the end of each cutting movement.

16. The cutting tool of claim 1, wherein the cutting tool further comprises a spring for pretensioning the metal plate to a position, in which the second end of the lever engages with the engagement point closest to the fourth pivot point.

17. The cutting tool of claim 16, wherein the spring comprises a spiral spring that is connected between the metal plate and the lever.

18. The cutting tool of claim 1, wherein the cutting tool is arranged to operate such that when an object having a first thickness or diameter is cut, the second end of the lever engages with the engagement point closest to the fourth pivot point for performing a cutting movement that cuts off the object to be cut completely.

19. The cutting tool of claim 1, wherein the cutting tool is arranged to operate such that when an object having a second thickness or diameter, which is larger than the first thickness or diameter, is being cut, the second end of the lever engages with the engagement point second closest to the fourth pivot point in order to perform a first stepwise cutting movement, which cuts a first portion of the thickness or diameter of the object to be cut, whereafter in the subsequent cutting movement the second end of the lever engages with the engagement point closest to the fourth pivot point for performing a second stepwise cutting movement that cuts a second portion of the thickness or diameter of the object to be cut finalizing the cutting of the object to be cut.

20. The cutting tool of claim 1, wherein the cutting tool is arranged to operate such that when an object having a third thickness or diameter, which is larger than the second thickness or diameter, is being cut, the second end of the lever engages with the engagement point third closest to the fourth pivot point for performing the first stepwise cutting movement that cuts the first portion of the thickness or diameter of the object to be cut, whereafter in a subsequent cutting movement the second end of the lever engages with the engagement point second closest to the fourth pivot point for performing the second stepwise cutting movement and whereafter in a subsequent cutting movement the second end of the lever engages with the engagement point closest to the fourth pivot point for performing the third stepwise cutting movement that cuts the third portion of the thickness or diameter of the object to be cut finalizing the cutting of the object.

21. The cutting tool of claim 1, wherein the cutting tool is arranged to operate such that when an object is being cut, the second end of the lever engages with the engagement point whose distance from the fourth pivot point corresponds to the thickness of the object to be cut, in order for a stepwise cutting movement to be performed, whereafter in a subsequent cutting movement the second end of the lever engages with the engagement point next closest to the fourth pivot point for performing a next stepwise cutting movement.

22. A cutting tool comprising:
 a first cutting element having a first pivot point, a second pivot point and a third pivot point;
 a first elongated element having a first handle and a first tooth gear part and a fourth pivot point, the first elongated element coupled to the first cutting element at the second pivot point;
 a second elongated element having a second handle and a second tooth gear part, the second elongated element coupled to the first cutting element at the third pivot point such that the first and the second tooth gear parts engage one another;
 a second cutting element having a plurality of engagement points and forming a cutting jaw with the first cutting element, the second cutting element coupled to the first cutting element at the first pivot point; and
 a lever having a first end and a second end, the first end coupled to the first elongated element at the fourth pivot point and the second end interfacing with the engagement points on the second cutting element for performing stepwise cutting movements.

23. The cutting tool of claim 22 wherein the engagement points comprise notches.

* * * * *